(12) United States Patent
Kramer et al.

(10) Patent No.: US 12,216,782 B2
(45) Date of Patent: Feb. 4, 2025

(54) SECURE DATA ACCESS FOR ELECTRONIC DEVICES

(71) Applicant: Apple Inc., Cupertino, CA (US)

(72) Inventors: Conrad B. Kramer, San Francisco, CA (US); Cristina L. Formaini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 307 days.

(21) Appl. No.: 17/722,298

(22) Filed: Apr. 15, 2022

(65) Prior Publication Data

US 2022/0382895 A1    Dec. 1, 2022

Related U.S. Application Data

(60) Provisional application No. 63/195,658, filed on Jun. 1, 2021.

(51) Int. Cl.
*G06F 21/62* (2013.01)
(52) U.S. Cl.
CPC .............................. *G06F 21/6218* (2013.01)
(58) Field of Classification Search
CPC ............................................. G06F 21/62–629
See application file for complete search history.

(56) References Cited

U.S. PATENT DOCUMENTS

| 8,181,260 | B2 * | 5/2012 | Friedman | H04L 63/126 709/200 |
| 10,803,188 | B1 * | 10/2020 | Rajput | G06F 21/62 |
| 2014/0025949 | A1 * | 1/2014 | Kay | G06F 21/31 713/168 |
| 2015/0071436 | A1 * | 3/2015 | Christiansen | H04N 7/1675 726/4 |
| 2023/0177104 | A1 * | 6/2023 | Whitney | G06F 16/9577 715/234 |

OTHER PUBLICATIONS

Whitney, "How to Automate Your Life With Apple's Shortcuts App." PCMag, Jan. 18, 2022, retrieved from https://www.pcmag.com/how-to/automate-your-life-with-apples-shortcuts-app.

\* cited by examiner

*Primary Examiner* — Madhuri R Herzog
(74) *Attorney, Agent, or Firm* — BAKERHOSTETLER

(57) ABSTRACT

The subject disclosure provides systems and methods for providing secure data access for electronic devices. The secure data access can allow processes, such as scripts, at a device to be executed to obtain and process restricted data locally on the device without requesting user authorization for the access and processing. The secure data access can prevent the processes from exporting the data, and/or data derived from the data, from an execution space of the processes, whether locally on the device or externally from the device, without obtaining user authorization for the exportation. In this way, user authorizations can be obtained for securing restricted data, in a way that is efficient for the device, for the processes accessing and processing the data, and for the user.

20 Claims, 11 Drawing Sheets

SECURE DATA ACCESS FOR ELECTRONIC DEVICES

CROSS REFERENCE TO RELATED APPLICATIONS

This application claims the benefit of priority to U.S. Provisional Patent Application No. 63/195,658, entitled "Secure Data Access for Electronic Devices," filed on Jun. 1, 2021, the disclosure of which is hereby incorporated herein in its entirety.

TECHNICAL FIELD

The present description relates generally to electronic devices, including, for example, to secure data access for electronic devices.

BACKGROUND

Electronic devices often store private data for which user approval is required before the private data can be accessed.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Electronic devices such as personal computers (e.g., desktop computers and laptop computers), portable electronic devices (e.g., tablet computers and smartphones) and wearable devices (e.g., smartwatches, etc.) often store data, such as private data, for which access is to be restricted. In some scenarios, a user can be prompted to allow access to the private data prior to access being allowed by the electronic device (e.g., prior to allowing the data to be obtained from storage). However, restricting the initial access to data in this way can be both inefficient in terms of computing and power resources, and disruptive to a user's experience, particularly in cases in which, for example, multiple accesses of the same or similar data and/or accesses of multiple data are performed on-device as part of a single process.

Aspects of the subject technology can allow on-device access and/or processing of restricted data without obtaining user authorization, and can also maintain the security of the restricted data by preventing on-device and/or external exportation of the secure data (and/or processed data generated from the secure data) without user authorization. In this way, aspects of the subject technology can improve the user experience and/or the efficiency of resource usage of an electronic device (e.g., processing and/or memory usage), such as by maintaining secure control of restricted data while reducing the number and/or frequency of user prompts for data access authorization.

Figure 1:
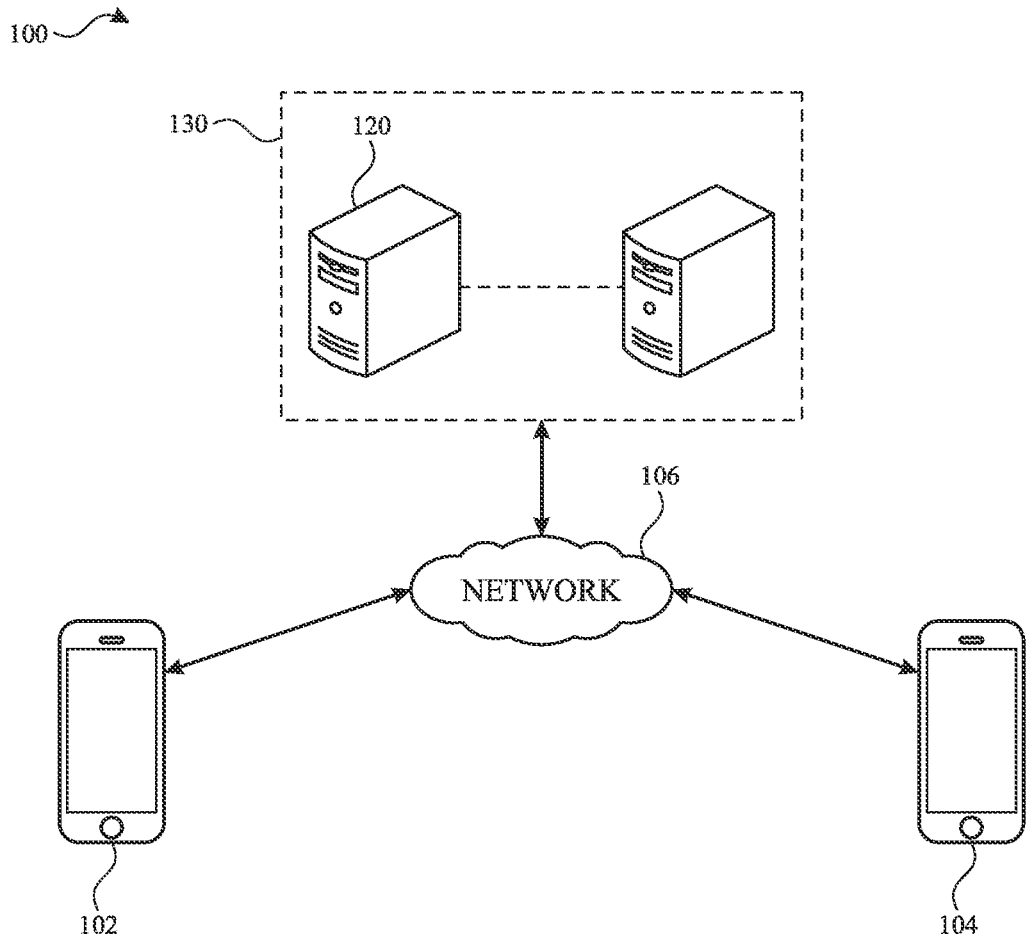
FIG. 1 illustrates an example network environment in accordance with one or more implementations.

FIG. 1 illustrates an example network environment 100 that includes various devices in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102 and 104, a network 106, and one or more servers 120 communicatively coupled to the network 106. The network 106 may, for example, be include portions of a public network such as the Internet. The network 106 may include local area network (LAN) components, such as Wi-Fi routers and/or Ethernet connections that are local to each of electronic devices 102 and 104, that couple the corresponding electronic device to the wider Internet. A LAN that connects electronic devices 102 and/or 104 to the Internet may include one or more different network devices/network mediums and/or may utilize one or more different wireless and/or wired network technologies, such as Ethernet, optical, Wi-Fi, Bluetooth, Zigbee, Powerline over Ethernet, coaxial, Z-Wave, generally any wireless and/or wired network technology that may communicatively couple an electronic device to the Internet. Portions of the network 106 include a cellular communications network that includes one or more base transceivers at fixed locations in each of several geographic "cells", the base transceivers communicating wirelessly with end devices such as electronic devices 102 and 104, and via wired and/or satellite communications with various switched networks for voice calls and text messages, mobile data, and public telephony.

One or more of the electronic devices 102 and 104 may be, for example, a portable computing device such as a laptop computer, a smartphone, a smart speaker, a peripheral device (e.g., a digital camera, headphones), a digital media player, a tablet device, a wearable device such as a smartwatch or a band, or any other appropriate device that includes and/or is communicatively coupled to, for example, one or more wired or wireless interfaces, such as Wi-Fi communications circuitry, cellular communications circuitry, Bluetooth communications circuitry, Zigbee communications circuitry, near field communication (NFC) communications circuitry, and/or other wired or wireless communications circuitry, and is provided with software and/or hardware for sending and receiving electronic messages.

By way of example, in FIG. 1 each of the electronic devices 102 and 104 is depicted as a smart phone. In one or more implementations, one or more of the electronic devices 102 and 104 may be a smart television, a laptop or another mobile device such as a tablet device, such as a smart phone or a smart watch. In one or more implementations, one or more of the electronic devices 102 and 104 may be integrated into its corresponding display device. One or more of the electronic devices 102 and 104 may be, and/or may include all or part of, the electronic system discussed below with respect to FIG. 11.

The electronic devices 102 and 104 may include a processor, a memory, a communication interface, and/or other electronic components. The processor may include suitable logic, circuitry, and/or code that enable processing data and/or controlling operations of the device. In this regard, the processor may be enabled to provide control signals to various other components of the device. The processor may also control transfers of data between various portions of the device. Additionally, the processor may enable implementation of an operating system or otherwise execute code to manage operations of the device. The memory may include suitable logic, circuitry, and/or code that enable storage of various types of information such as received data, generated data, code, and/or configuration information. The memory may include, for example, random access memory (RAM), read-only memory (ROM), flash, and/or magnetic storage. In one or more implementations, one or more of the processor, the memory, the communication interface, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

One or more of the servers 120 may be, and/or may include all or part of the electronic system discussed below with respect to FIG. 11. Each of the servers 120 may include one or more servers, such as a cloud 130 of servers. For explanatory purposes, two servers are shown and discussed with respect to various operations for providing network data to and/or between electronic devices 102 and 104. However, these and other operations discussed herein may be performed by one or more servers, and each different operation may be performed by the same or different servers.

For explanatory purposes, the network environment 100 is illustrated in FIG. 1 as including electronic devices 102 and 104, and the servers 120; however, the network environment 100 may include any number of electronic devices and any number of servers.

Figure 2:
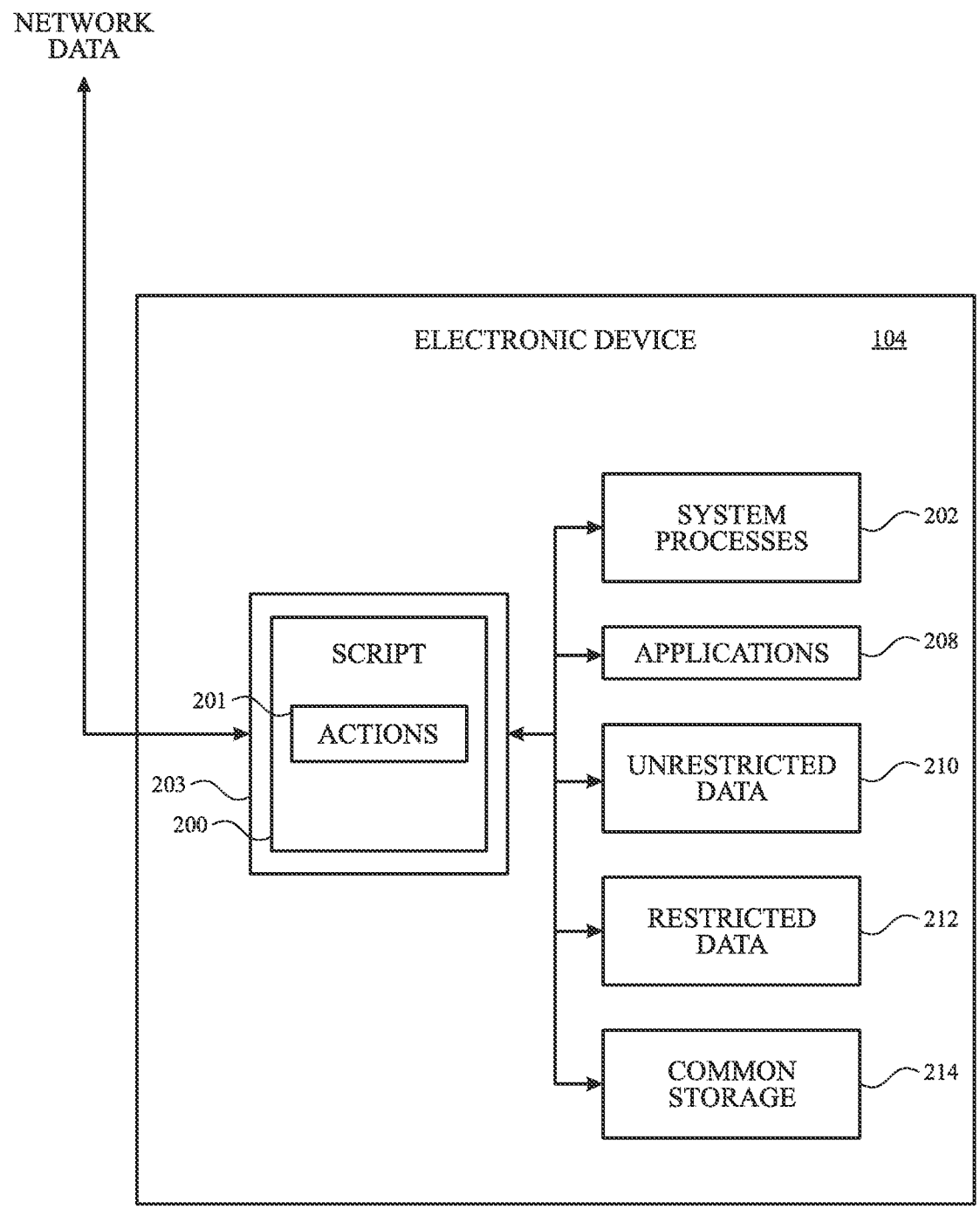
FIG. 2 illustrates a schematic diagram of an example electronic device that may provide secure access to restricted data in accordance with one or more implementations.

Electronic device 102 and/or electronic device 104 store and/or have access to various forms of data. For example, as illustrated in FIG. 2, an electronic device such as electronic device 104 may store data that includes restricted data 212. Restricted data 212 may include, for example, data associated with the identity of a user of the electronic device or the identity of another person (e.g., data such as names, phone numbers, email addresses, images, videos, etc.), financial data, location data, health data, audio and/or video data, user communications such as messages (e.g., text messages, social media messages, or the like), user activity data (e.g., browsing history or other device usage history), and/or any other data related to a particular person and/or the activity or behavior of a particular person or group of people.

As shown in FIG. 2, an electronic device such as electronic device 104 may also store or have access to unrestricted data 210. As examples, unrestricted data 210 may be any data that is publicly available and/or unassociated with a particular person or user, such as a time of day, a day of the week, or a stock price. In the example of FIG. 2, the restricted data 212 and the unrestricted data 210 are stored locally at the electronic device 104. In one or more implementations, the electronic device 104 may also have access to restricted data and/or unrestricted data stored remotely from the electronic device, such as at a server such as one of servers 120. For example, remotely stored data may include restricted data that is stored at a server 120 in connection with an account (e.g., a cloud storage account of a user of the electronic device 104) to which the electronic device 104 is registered and/or signed in.

As shown in FIG. 2, a computing device such as the electronic device 104 may include a script 200. As shown, the script 200 may include instructions to perform one or more actions 201. The actions 201 may include one or more actions to obtain data (e.g., restricted data 212 and/or unrestricted data 210 stored at the device, and/or restricted and/or unrestricted data stored off device such as at a server), one or more internal actions to process the obtained data, and/or one or more actions to export data (e.g., the same data obtained by other actions and/or data associated with or derived from the obtained data).

In one or more implementations, the script 200 may be generated and/or executed with an application at the electronic device 104, such as an application 203. For example, generating the script 200 may include generating instructions to perform a user compilation of the actions 201, responsive to user inputs to the application 203. In some implementations, the script 200 is received from another computing device, such as electronic device 102 or the server 120. In one or more implementations, the script 200 may be a suggested compilation of actions 201 generated automatically by the electronic device 104 and/or the server 120.

As shown in the example of FIG. 2, the electronic device 102 may also include one or more system processes 202, one or more applications 208 installed thereon, and may include memory such as common storage 214 that is accessible to various processes at the electronic device. For example, the common storage 214 may be storage for a clipboard process that temporarily stores data copied from one application or process for access by another application or process. As shown in the example of FIG. 2, the script 200 may communicate with and/or otherwise interact with any or all of the system processes 202, the applications 208, the unrestricted data 210, the restricted data 212, and/or the common storage 214. Depending on the instructions and/or actions that are included in a particular script 200, the script 200 may obtain restricted data and/or unrestricted data, interact with one or more of applications 208 to process the obtained data, and/or interact with the system processes 202 and/or the one or more of the applications 208 to export data (e.g., to export the obtained data and/or modifications of the obtained data locally on the device. Exporting the data may include exporting the data to the common storage 214 and/or to a third party application different from the application from which the data is obtained and/or by which the data is processed, and/or can include exporting the data externally from the electronic device 104 to another electronic device or server.

In accordance with aspects of the disclosure, the application 203 and/or the system processes 202 may allow the script 200 to obtain and/or process data, including restricted data 212, on-device without requesting user authorization to obtain and/or process the data, and may prevent exportation of restricted data or data derived from the obtained restricted data, whether the exportation is on-device or off-device. As described in connection with various examples herein, exportation of data can be, for example, any exfiltration action that exports data from an execution space of the script 200.

Figure 3:
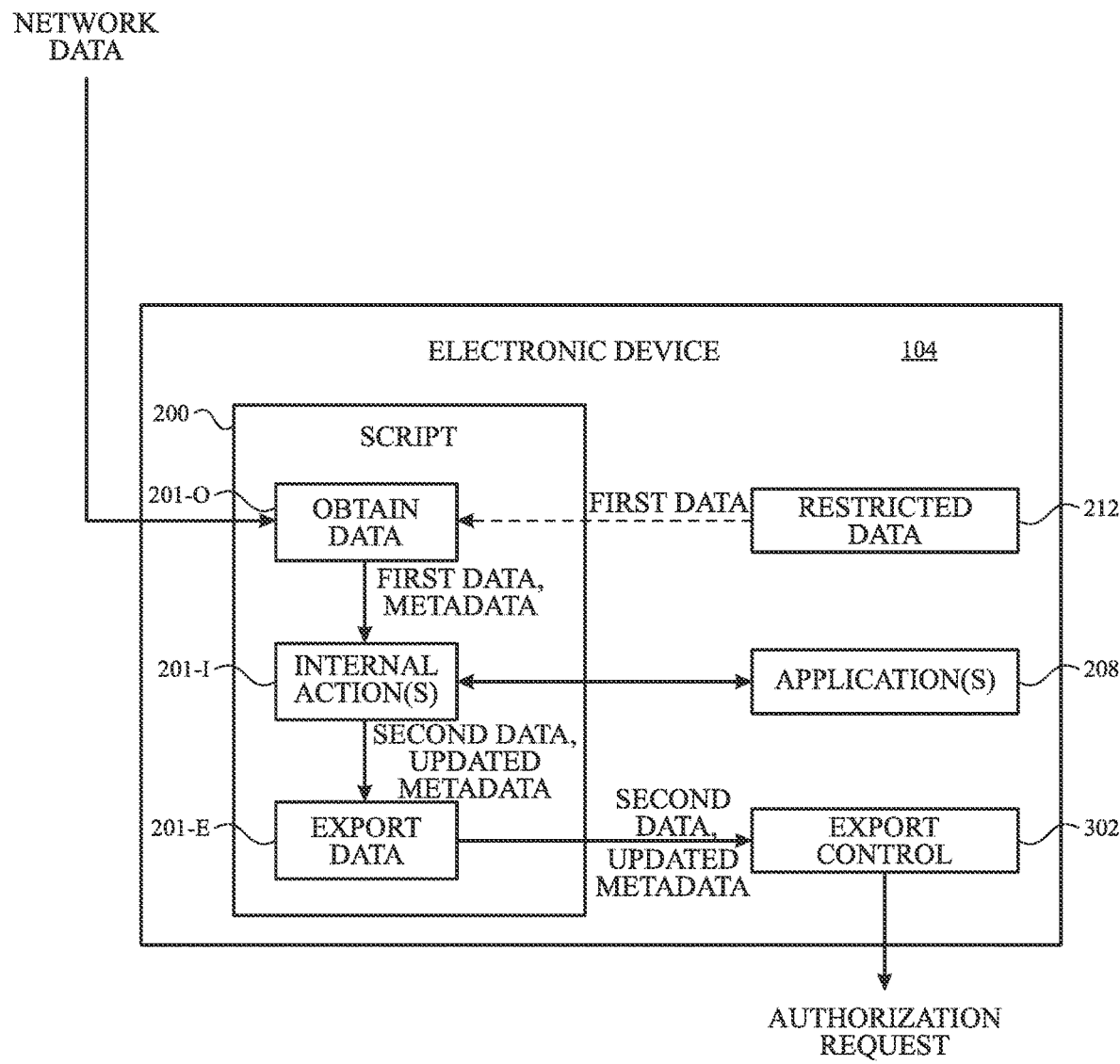
FIG. 3 illustrates a schematic diagram of an example electronic device preventing exportation of data in accordance with one or more implementations.

FIG. 3 illustrates an example in which the script 200 includes instructions to perform an action 201-O to obtain data (e.g., first data) and an export action 201-E that, when performed exports data (e.g., second data such as the obtained data or data associated with the obtained data) from an execution space of the script. In various use cases, the action 201-O may obtain the data directly (e.g., as shown in the example of FIG. 3) or may communicate with one or more of applications 208 to obtain the data. In the example of FIG. 3, the obtained data includes restricted data 212, and the application 203 and/or the system processes 202 (see FIG. 2) may identify the data obtained by the action 201-O as unauthorized to be exported. Identifying the data as unauthorized to be exported may include detecting a privacy flag or other privacy indicator stored in associated with the data, identifying the data as having a data type that is unauthorized to be exported, obtaining the data from storage indicated to be storage for restricted data, or identifying an application providing the data as an application the provides data that is unauthorized to be exported (as examples).

FIG. 3 also shows how the script 200 may include instructions to perform one or more additional actions, such as internal actions 201-I that are performed after the action 201-O to obtain the data, and before the export action 201-E. As shown, one or more of the internal actions 201-I may also, or alternatively, utilize one or more of the applications 208 to process and/or otherwise modify and/or extract other data from the obtained data from action 201-O. Although a single action 201-O to obtain data is shown in FIG. 3 for clarity of this discussion, it is appreciated that the script 200 may include multiple actions 201-O to obtain various data before and/or interleaved with one or more of the internal actions 201-I. For example, one or more of the internal actions 201-I may be an action to combined two different types of obtained restricted data (e.g., to add a restricted image stored at the device to a restricted note stored at the device, such as for exportation of the note including the image).

In one or more examples, obtaining the data (e.g., the first data) includes obtaining image data from a photos application. In some examples, the internal actions 201-I may include an internal action that extracts information from the image data, or otherwise processes the image data. For example, the internal action may provide the image data to an image processing application of the applications 208, and receive information extracted from the image data (e.g., identifiers of people or objects in the image data based on facial recognition or object detection), or a processed (e.g., filtered, enhanced, modified in size or resolution, etc.) version of the image from the image processing application.

As indicated in FIG. 3, the internal action(s) 201-I may generate second data (e.g., extracted information from an image, or a modified image, in the image example above) from the first data obtained by the action 201-O. In some examples, obtaining the data (e.g., obtaining the first data) includes obtaining the data from an application of the applications 208 (e.g., a photos application, a calendar application, a mapping application, etc.) at the electronic device 104, and the exportation of the second data includes providing information associated with the data to another application (e.g., a messaging application, a social media application, an email application, etc.) at the electronic device 104.

In one or more implementations, the electronic device 104 (e.g., the application 203 and/or the system processes 202 of FIG. 2) may track the first data through the internal actions 201-I of the script 200. For example, as illustrated in FIG. 3, tracking the first data may include generating metadata for the first data in response to determining that the first data meets the set of one or more criteria (e.g., the first data is private data or restricted data). Generating the metadata may include generating metadata that describes a time of access of the data, a type of the data, an identifier or filename of the data, an identifier of an application that generated and/or provided the data, a privacy indicator or flag, a size of the data, and/or any other metadata that describes the obtained data. In some examples, performing one or more of the internal actions 201-I includes processing the first data to generate the second data, and tracking the first data further includes generating updated metadata based on the metadata and the internal action. For example, the second data may be a modification of the first data, and the updated metadata may include the metadata corresponding to the first data, and additional metadata that describes the modification (e.g., an identification of any data added to or extracted from the first data, an identifier of an application that processed and/or modified the first data, a time of the modification or processing, or other information describing the modification or processing).

In the example of FIG. 3, prior to completing the export action 201-E, an export control process 302 at the electronic device 104 (e.g., an export control process implemented by the application 203 and/or the system processes 202 of FIG. 2) prevents the script 200 from exporting the data. In the example of FIG. 3, the export control process 302 requests authorization (e.g., by outputting an authorization request such as a user prompt) from the user of the electronic device 104 to perform the export action 201-E on the data.

Figure 4:
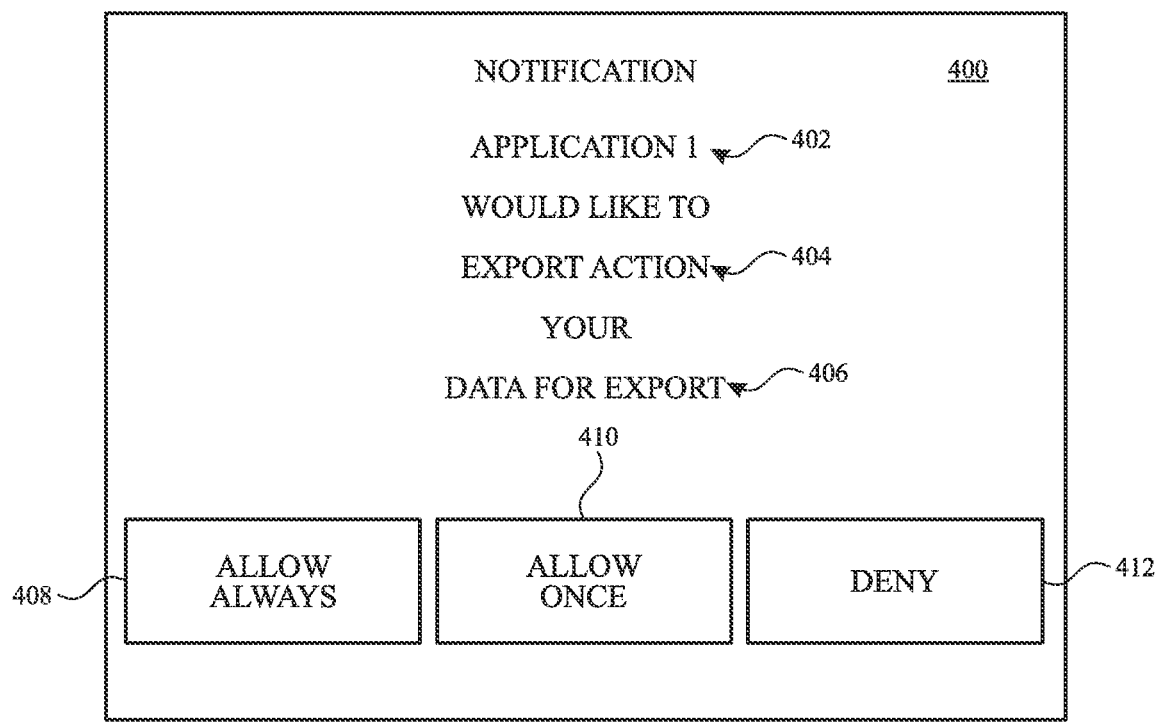
FIG. 4 illustrates an example of a prompt that may be provided for obtaining user authorization for exportation of data in accordance with one or more implementations.

FIG. 4 illustrates an example of an authorization request that may be provided by the electronic device 104. For example, requesting the authorization to perform the exportation of the second data (e.g., by the export action 201-E)

may include presenting, in a user prompt such as notification 400, a request for authorization with information identifying the data and/or the export action to be performed with the data. As shown in the example of FIG. 4, the notification 400 may include data information 406 (e.g., "DATA FOR EXPORT") that identifies the data for export by the export action 201-E. As shown, the notification 400 may also include export information 404 that describes the export action to be authorized. As shown, the notification may also include application information (e.g., "APPLICATION 1") identifying an application for performing the export action.

In one or more implementations, the data information 406 may include information identifying the original, unmodified first data and/or the modified and/or processed second data. In one or more implementations, the data information 406 may include a type of the first data, an amount of the first data, and/or a preview of the first data (as examples). In one or more implementations, the application information 402 may identify an application for performing the export action.

In one illustrative example, the script 200 may include an action 201-O to obtain the last five photos captured by the electronic device 104, and an export action 201-E to provide the obtained last five photos to a messaging application at the electronic device 105 and/or to send the obtained last five photos to a particular contact in a message, using a messaging application at the electronic device 104. In this example, the notification 400 may including information such as "Messaging Application would like to send your last five photos", in which "Messaging Application" corresponds to the application information 402, "send" corresponds to the export information 404, and "last five photos" corresponds to the data information 406. In this example, the text, "Messaging Application", can include a title of the messaging application and/or can be or include a logo or other visual indicator of a messaging application at the electronic device 104. In this example, the data information 406 may also, or alternatively, include one or more thumbnail images corresponding to the last five photos, may include one of the last five photos, or may include all of last five photos for preview, prior to authorization. In this example, the notification 400 can be provided to obtain user authorization prior to providing the obtained last five photos to the messaging application and/or prior to allowing the messaging application to send the obtained last five photos.

In some examples, the export action may not be associated with a particular application, and the notification 400 can be provided without the application information 402. For example, the exportation of the second data may include copying the data obtained by the action 201-O and/or data generated by one or more of the internal actions 201-I to a clipboard at the electronic device 104 (e.g., a clipboard implemented using common storage 214 that is accessible by one or more applications and/or processes at the electronic device). In this example, the notification 400 may be provided without application information 402, and may include, for example, "Your device would like to copy information A to the clipboard", in which "copy . . . to the clipboard" corresponds to the export information 404, and "information A" corresponds to the data information 406.

As shown in FIG. 4, a user prompt (e.g., notification 400) for authorization to export data by a script such as script 200 may include user-selectable options, such as an "approve always" option 408, an "approve once" option 410, and a "deny" option 412. However, it is appreciated that the "approve always" option 408, the "approve once" option 410, the and "deny" option 412 of FIG. 4 are illustrative, and that other types and/or titles of selectable options to authorize or decline authorization of exportation of data can be used.

Figure 5:
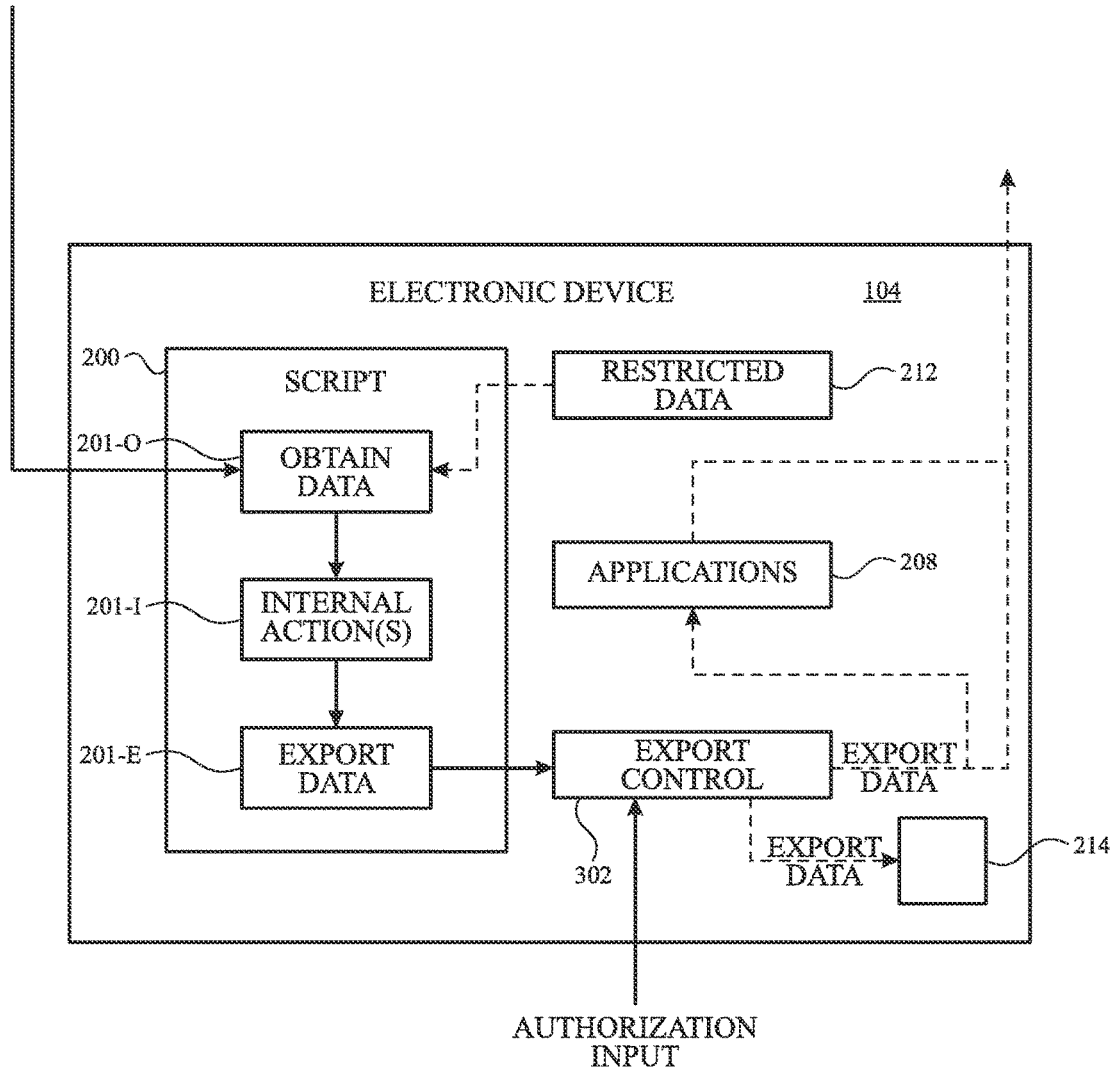
FIG. 5 illustrates a schematic diagram of an example electronic device allowing exportation of data based on user authorization in accordance with one or more implementations.

FIG. 5 illustrates an example in which a user provides an authorization input to the electronic device 104, responsive the user prompt (e.g., the notification 400) requesting authorization to export data. For example, the authorization input of FIG. 5 may correspond to the user of the electronic device 104 selecting one of the "approve always" option 408 or the "approve once" option 410 of FIG. 4. In other examples, the user of the electronic device 104 may speak or otherwise provide the authorization input.

As shown in FIG. 5, in response receiving the authorization (e.g., receiving an authorization input at the export control process 302) from the user to perform the export action 201-E, the executing script 200 performs the export action 201-E for exportation of the data (e.g., export data). In contrast with the example of FIG. 5, if the electronic device 104 were to instead receive a denial of the authorization from the user to perform the export action (e.g., a selection of the "deny" option 412 of FIG. 4), execution of the script 200 may end without performing the export action 201-E.

As indicated in FIG. 5, performing the export action 201-E may include exporting data (e.g., export data such as the second data of FIG. 3) internally at the electronic device (e.g., to one or more of applications 208, and/or to common storage 214 or other memory of the electronic device 104 that is accessible by a process at the electronic device 104 that is separate from the script 200) and/or exporting the data off device (e.g., to one or more remote devices such as electronic device 102 or to a remote server such as server 120). As indicated in FIG. 5, exporting the data off device may be performed directly by the executing script, or may be performed entirely or in part, by one or more of applications 208 after allowance of the export action by the export control process 302.

In one illustrative example, the exportation of the second data may include copying the data obtained by the action 201-O and/or data generated by one or more of the internal actions 201-I from the obtained data to a clipboard at the electronic device 104 (e.g., a clipboard implemented using common storage 214 that is accessible by one or more applications and/or processes at the electronic device). In another illustrative example, the exportation of the second data includes adding the obtained data and/or information generated from the obtained data to a calendar event or a note stored at the electronic device 104.

In another illustrative example, obtaining the first data with the action 201-O includes obtaining audio data using a microphone of the electronic device 104, and the exportation of the second data includes sending the audio data to a remote device or server. In another illustrative example, obtaining the first data with the action 201-O includes obtaining audio data using a microphone of the electronic device 104, and the exportation of the second data includes playing back the audio data using a speaker of the electronic device 104. In some examples, exportation of the second data includes accessing a remote server.

In one or more implementations, the exportation of the second data includes providing the second data to a first application (e.g., a messaging application) of the applications 208 that is separate from a second application (e.g., the application 203 of FIG. 2) executing the script. In one or more implementations, the exportation of the second data includes generating a communication to another computing device (e.g., the electronic device 102) using a first application (e.g., a messaging application) of the applications 208 that is separate from a second application (e.g., the application 203 of FIG. 2) executing the script.

In the example of FIGS. 3, 4, and 5, the script 200 obtains and identifies data that is not authorized to be exported, and obtains user authorization before performing the export action 201-E. It is also appreciated that the script 200 may obtain other data, such as public data or unrestricted data, and identify the other data as authorized to be exported without obtaining user authorization. For example, the script 200 may perform the same export action 201-E (e.g., send in a message, copy to a clipboard, add to a calendar, etc.) on the unrestricted (e.g., public) data without prior user authorization based on the unrestricted data not meeting the first set of criteria that would cause restricted data to be prevented from exportation. For example, the script 200 may be executed to obtain and export public data (e.g., a time, a date, or other publicly available information such as a stock price) without any prompts.

In a scenario in which the user of the electronic device selects the "allow once" option 410 to allow exportation of data by the script 200 once, a later iteration of the script 200 (e.g., if the user of the electronic device 104 or an automatic trigger later causes the electronic device 104 to again execute the script 200), the operations described in connection with FIGS. 3-5 may be performed again to obtain and/or process the data without requesting user authorization, and to request user authorization prior to exportation of the data or information associated with the data.

In a scenario in which the user of the electronic device selects the "allow always" option 408 to allow exportation of data by the script 200, the electronic device 104 (e.g., the export control process 302, the application 203, and/or the script 200) may store the user authorization. For example, FIG. 6 illustrates an implementation in which the export control process 302 stores a prior user authorization 600 for performing the export action 201-E of the script 200.

Figure 6:
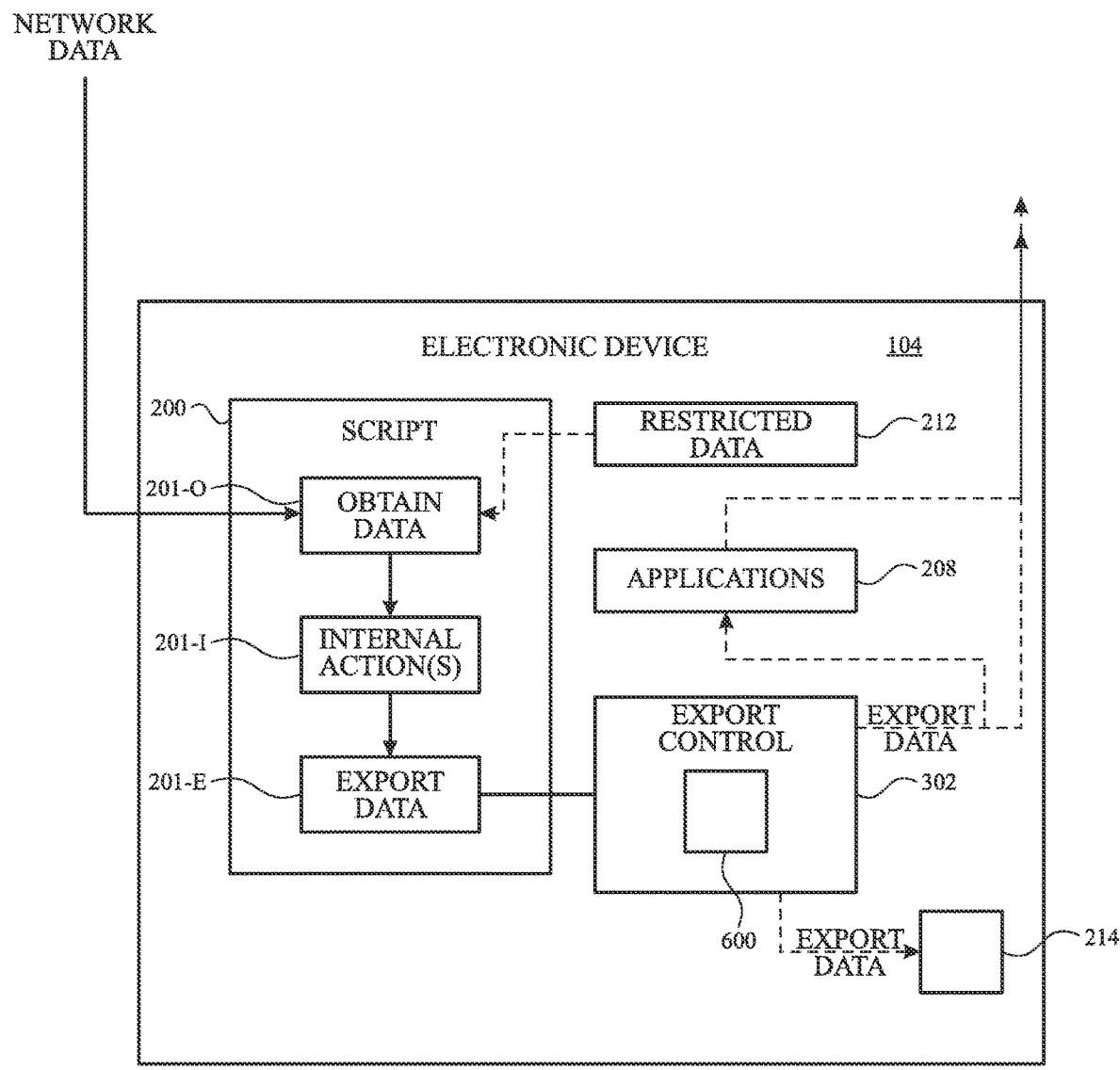
FIG. 6 illustrates a schematic diagram of an example electronic device allowing exportation of data based on prior user authorization in accordance with one or more implementations.

As illustrated in FIG. 6, in a later iteration of the script 200 (e.g., initiated when the user of the electronic device 104 or an automatic trigger later causes the electronic device 104 to again execute the script 200) while the prior user authorization 600 is stored, the electronic device 104 may perform the action 201-O to obtain restricted data 212, perform one or more internal actions 201-I, and export the obtained data and/or information related to the obtained data by the export action 201-E, without again requesting authorization from the user to perform the export action 201-E on the newly obtained restricted data 212. In various use cases, a prior user authorization 600 can be stored for each script 200, for each of one or more export actions within a script 200, for each application to which a script includes instructions to export data and/or for which a script includes instructions to use to export data, and/or for each data type for which a script 200 includes instructions to export (as examples). In one or more use cases, a user may provide an "allow always" approval for one or more export actions in a script and an "allow once' approval for one or more other export actions in that same script, and the electronic device 104 may store prior user authorizations 600 only for those one or more export actions for which an "allow always" approval was received (e.g., and may again request user authorization for later executions of the one or more other actions).

In one or more implementations, the electronic device 104 (e.g., an application at the electronic device or a system process at the electronic device) may provide a script settings pane by which a user can view, edit, and/or delete the prior user authorization 600 and/or any other previously granted permissions or authorizations provided in connection with executing a script at the electronic device 104 (e.g., a prior authorization to send the last three photos in a message). As an example, the electronic device 104 may provide one settings pane or section per script, one settings pane or section per exporting application, one settings pane and/or section per data type, and/or one settings pane or section per export action (e.g., send a message, copy to clipboard, add to calendar, etc.), to allow the user to view, edit, and/or delete prior authorizations and/or permissions.

Figure 7:
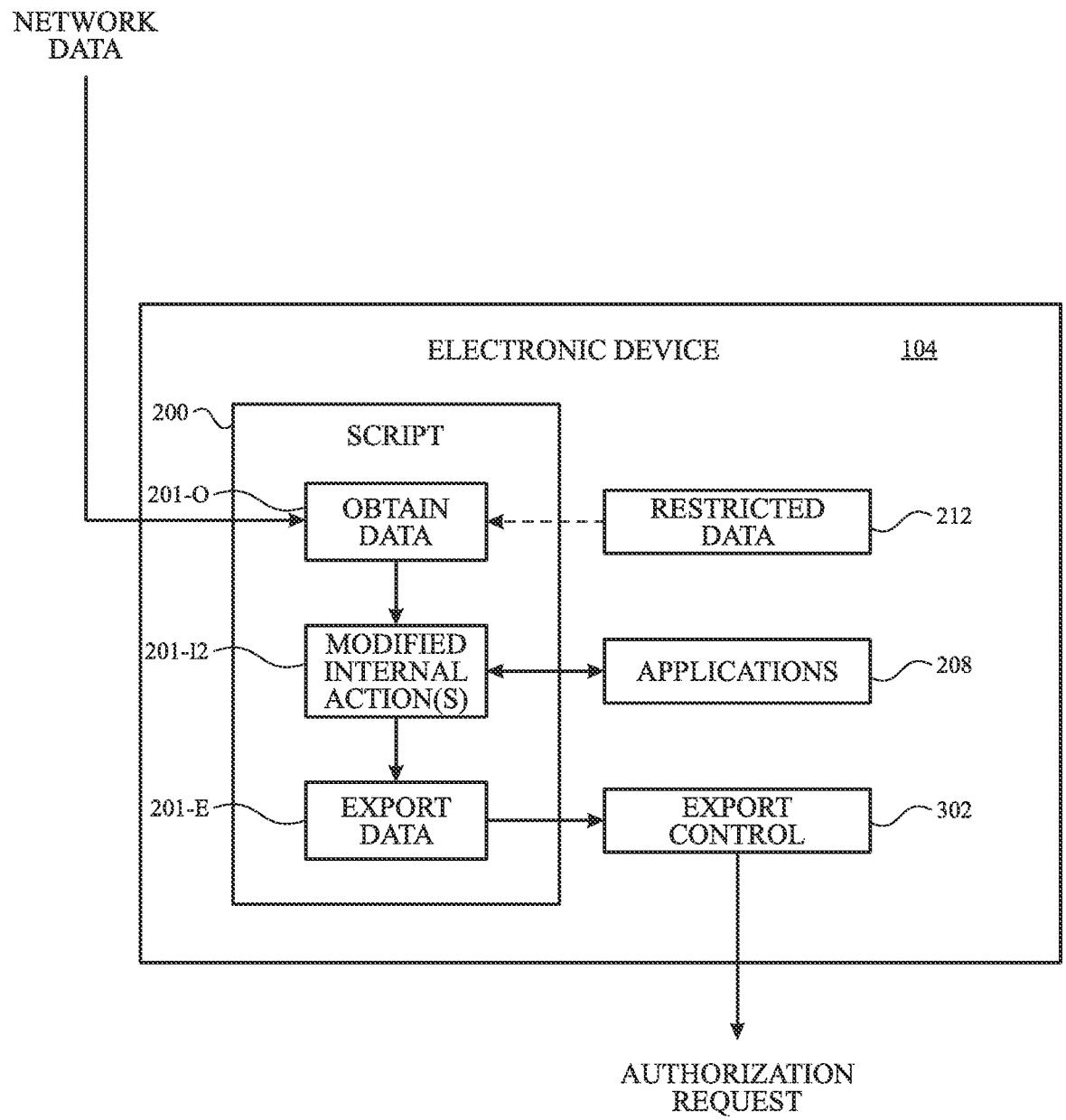
FIG. 7 illustrates a schematic diagram of an example electronic device preventing exportation of data following a prior user authorization in accordance with one or more implementations.

In one or more operational scenarios, a script 200 that includes an export action 201-E for which a prior user authorization 600 is stored may be modified (e.g., by a user of the electronic device 104). For example, FIG. 7 illustrates a scenario in which the internal actions 201-I have been modified to form modified internal actions 201-I2. For example, the internal actions 201-I may include an action to filter a photo obtained by the action 201-O, and the modified internal actions 201-I2 may include an action to detect an object in a photo obtained by the action 201-O. In other examples, the amount of data obtained by the action 201-O may be modified (e.g., from an action to obtain the last five photos captured by the electronic device 104 to an action to obtain the last seven photos captured by the electronic device 104). In these scenarios, even though the export action 201-E may remain unchanged (e.g., send in a message, copy to the clipboard, add to calendar), the prior user authorization 600 may be deleted when any change to the internal action 201-I and/or the amount or type of data obtained by the action 201-O is changed. For example, in FIG. 7, the prior user authorization 600 has been deleted due to the modification of the internal actions of the script 200.

Figure 8:
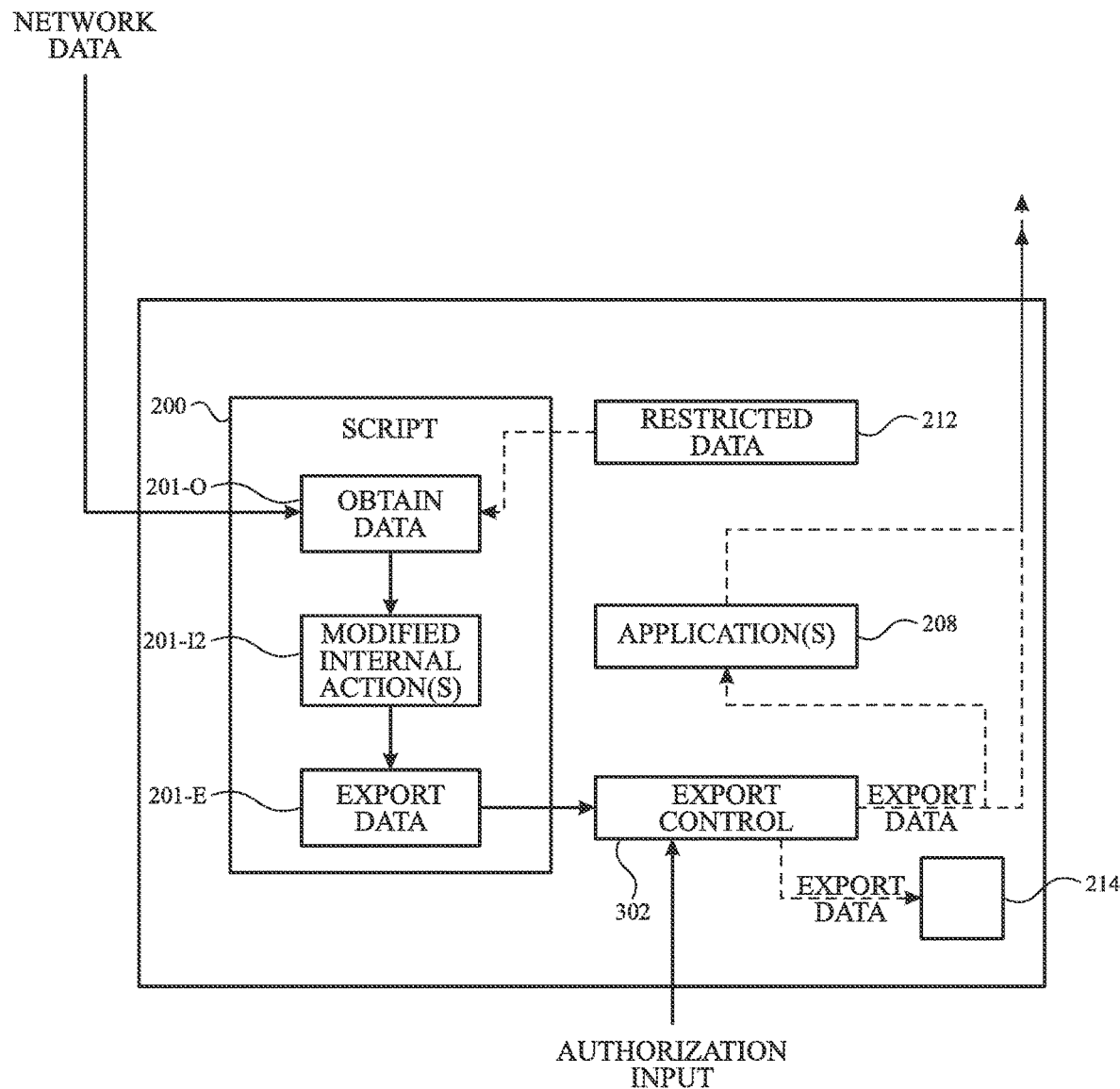
FIG. 8 illustrates a schematic diagram of an example electronic device allowing exportation of data by a modified script based on user authorization in accordance with one or more implementations.
Figure 9:
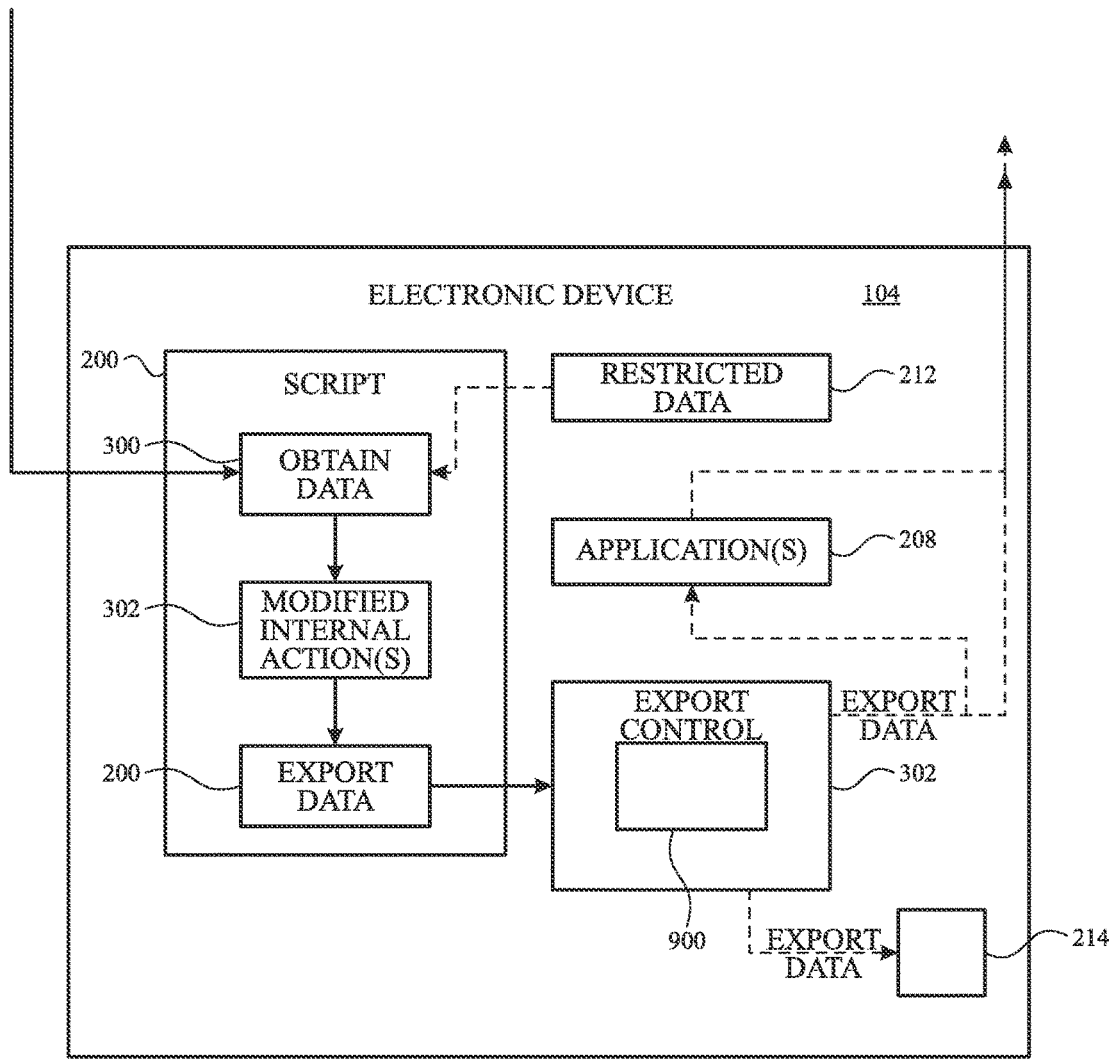
FIG. 9 illustrates a schematic diagram of an example electronic device allowing exportation of data by a modified script based on a prior user authorization for the modified script in accordance with one or more implementations.

As shown in FIG. 8, the data obtained by the action 201-O and processed and/or modified by the modified internal actions 201-E (e.g., without requesting user authorization), can be exported using the export action 201-E after a new authorization input is received by the electronic device 104 (e.g., by the export control process 302). As illustrated in FIG. 9, if the authorization input obtained in the example of FIG. 8 is an "allow always" input, the electronic device 104 (e.g., the application 203, the export control process 302, and/or the script 200) may store a new prior user authorization 900 and may allow later exportation of data by a later execution of the script 200 based on the prior user authorization 900 for the script 200 including the modified internal actions 201-I2.

Figure 10:
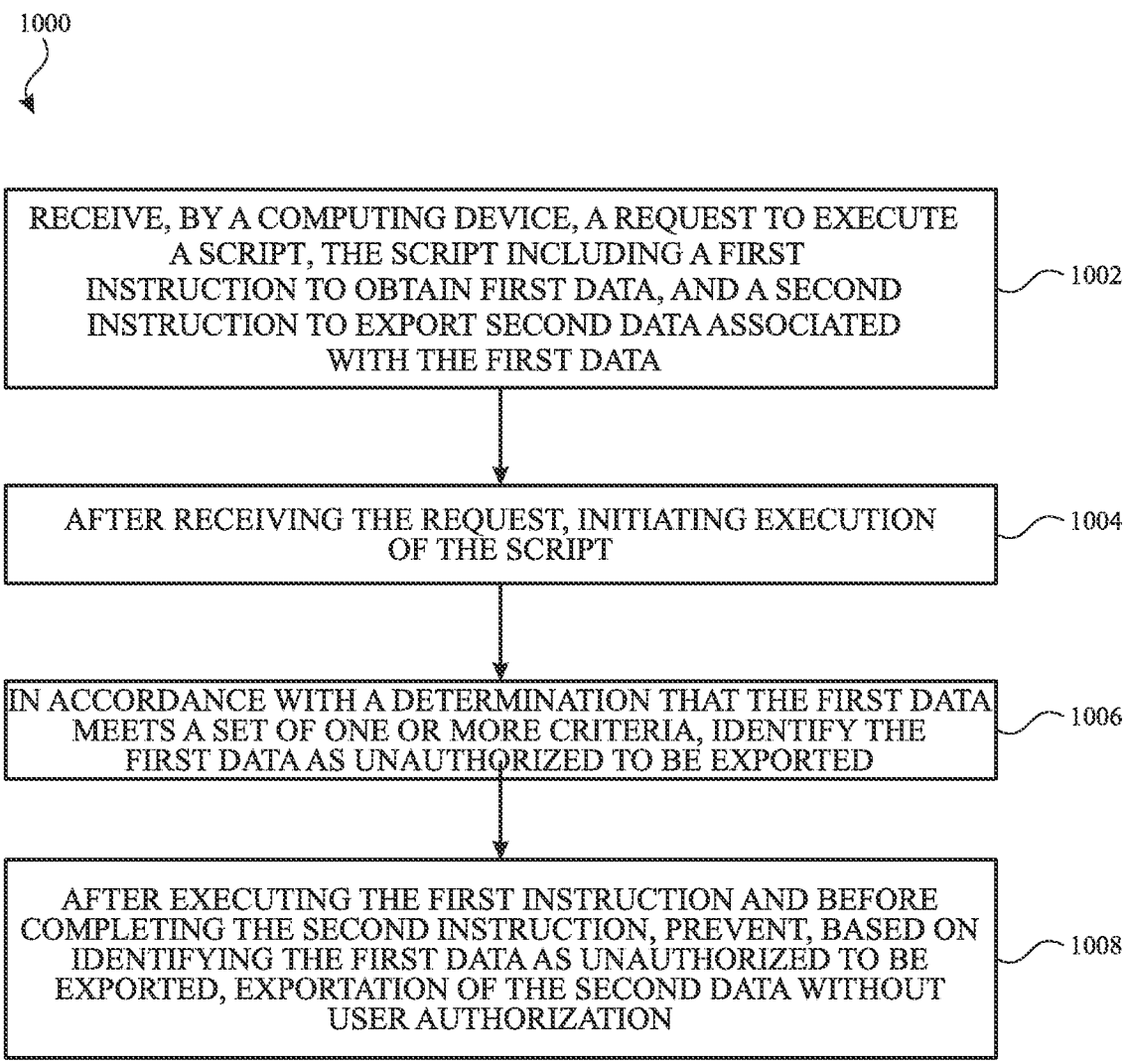
FIG. 10 illustrates a flow diagram of an example process for providing secure data access in accordance with one or more implementations.

FIG. 10 illustrates a flow diagram of an example process 1000 for providing secure data access, in accordance with one or more implementations. For explanatory purposes, the process 1000 is primarily described herein with reference to the electronic device 104 of FIG. 1. However, the process 1000 is not limited to the electronic device 104 of FIG. 1, and one or more blocks (or operations) of the process 1000 may be performed by one or more other components and/or other suitable devices. Further for explanatory purposes, the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

At block 1002, a computing device (e.g., electronic device 104) receives a request to execute a script (e.g., a script 200). The script may include a first instruction to obtain first data. The script may also include a second instruction to export second data associated with the first data. In some examples, receiving the request corresponds to receiving a user input selecting a representation of the script. In some examples, the second data is the first data. In some examples, the second data is a modification of the first data. In some examples, the second data includes data extracted from the first data (e.g., by one or more internal actions, such as internal actions 201-I of FIG. 3, performed based on a third instruction in the script). In some examples, the second data is a processed version of the first data (e.g., processed in accordance with one or more internal actions, such as internal actions 201-I of FIG. 3, performed based on a third instruction in the script).

At block 1004, after receiving the request, the computing device may initiate execution of the script. Execution of the script may be performed by an application (e.g., application 203 of FIG. 2) for executing scripts at the computing device and/or by one or more system processes (e.g., system processes 202) at the computing device. In one or more implementations, the script may be generated using an application (e.g., application 203) at the computing device. For example, a user of the computing device may generate a user compilation of multiple actions (e.g., action 201-O, internal actions 201-I, and/or export action 201-E of FIG. 3), by providing user inputs to the application, the user inputs defining the actions in the script. The scripting application (e.g., application 203) may generate the instructions for performing each action included in the script by the user. In other examples, prior to receiving the request to execute the script, the computing device may receive the script from another computing device (e.g., the electronic device 102 or another electronic device). In other examples, the script may be a suggested compilation of actions generated automatically by the computing device.

At block 1006, in accordance with a determination that the first data meets a set of one or more criteria, the computing device (e.g., the application running the script and/or a system process at the computing device) may identify the first data as unauthorized to be exported. In some examples, meeting the set of one or more criteria indicates that the first data is private and/or otherwise restricted data, such as restricted data 212 of FIG. 2. In some examples, the first data is identified as being unauthorized to be exported after initiating execution of the script. The computing device may execute the first instruction, at least in part, by obtaining the first data without requesting authorization from a user of the computing device.

In one or more implementations, the script includes a third instruction to perform at least one internal action (e.g., one or more of internal actions 2014) on the first data prior to executing the second instruction. In some examples, obtaining the first data at block 1002 includes obtaining image data from a photos application, and the internal action includes extracting information from the image data, or otherwise processing the image data.

In one or more implementations, the computing device may track the first data through the at least one internal action. In some examples, tracking the first data includes generating metadata for the first data in response to determining that the first data meets the set of one or more criteria (e.g., determining that first data is private data or restricted data). For example, the metadata may include an identifier of the first data, a type of the first data, a creation date or time of the first data, a location associated with the first data, a history of the first data, a size of the first data, a creator of the first data, an owner of the first data, or any other information describing the first data. In some examples, performing the internal action includes processing the first data to generate the second data. Tracking the first data may also include generating updated metadata based on metadata and the internal action. For example, generating the updated metadata may include adding a processing time, a processing date, an application identifier, or other information describing the processing of the first data by each internal action.

At block 1008, after executing the first instruction and before completing the second instruction (e.g., before executing the second instruction), the computing device (e.g., the application running the script and/or a system process at the computing device) may prevent, based on identifying the first data as unauthorized to be exported, exportation of the second data without user authorization. In various implementations, exportation of the second data can be any exfiltration action that exports data from an execution space in which the script is executing. In one or more implementations, exportation of the second data includes generating a communication to another computing device (e.g., electronic device 102) using a first application (e.g., one of applications 208, such as messaging application) separate from a second application (e.g., application 203) executing the script. In one or more implementations, the exportation of the second data includes storing information associated with the first data in memory (e.g., common storage 214 of FIG. 2) of the computing device that is accessible by a process (e.g., one or more of applications 208, system processes 202 and/or other processes) at the computing device that is separate from the script and/or from an application executing the script.

In one or more implementations, a request for authorization from a user of the computing device to perform the exportation of the second data may be provided. For example, the request for authorization to perform the exportation of the second data may be provided in a user prompt (e.g., a notification 400). The user prompt may include a presentation of information (e.g., data information 406) identifying the first data in the user prompt. The user prompt may include a presentation of information (e.g., data information 406) identifying the first data, a type of the first data (e.g., a photo, a video, a message, a file, a location, a name, contact information, etc.), and/or other information about the data to be exported. For example, the user prompt may include a preview of the first data (e.g., a thumbnail corresponding to a photo to be exported, or a preview of text to be included in a message to another computing device). In some examples, the request for authorization to perform the exportation of the second data (e.g., the user prompt) may include an identifier (e.g., an application information 402) of an application (e.g., a messaging application) for performing the exportation of the second data.

In one or more implementations, an internal action modifies the first data, and the updated metadata includes information identifying the original, unmodified first data, and information identifying the modified data. In one or more implementations, requesting the authorization to perform the exportation of the second data includes presenting, in a user prompt (e.g., the notification 400), the information identifying the original, unmodified first data.

In one or more implementations, the second instruction to export the second data includes an instruction to perform an export action (e.g., export action 201-E) for the exportation of the second data. In one or more implementations, the computing device may determine that third data (e.g., unrestricted data 210) does not meet the set of one or more criteria (e.g., is not restricted data), and may perform the export action (e.g., the same export action) on the third data without requesting user authorization. For example, the export action may be an action to send data in a message. The computing device may obtain user authorization before allowing sending of a photo (e.g., restricted data) in a message, but may send a current time of day (e.g., unrestricted data) in a message without requesting user authorization.

In one or more implementations, the computing device may receive the user authorization for the exportation of the second data, execute the second instruction for the exportation of the second data based on the user authorization, and execute a subsequent iteration of the script, including executing a subsequent iteration of the second instruction to export the second data without requesting an additional user authorization. For example, after receiving user authorization to send a photo in a message, the computing device may run a later iteration of the script including the same export action to send a photo, to send a new photo without requesting an addition authorization to send the new photo in a message.

For example, a user may provide authorization for the exportation of the second data by selecting an "allow always" option provided by the computing device. The computing device may store a received authorization (e.g., a prior user authorization 600) for the corresponding export action. In one or more implementations, one or more saved prior user authorizations can be removed if an amount of the data to be exported is changed or if another change to the script is received. In one or more implementations, saved prior user authorizations can be viewable, editable, and/or removable (e.g., via a settings application or service provided by the computing device) per application, per script, and/or per export action type.

In one or more implementations, the computing device may receive a change to an action such as an internal action of the script (e.g., as described above in connection with FIG. 7). For example, the change to the internal action may be a modification of a number of photos to include in a message or an update to add a tag of a person in the photo to the data to be sent in a message). The computing device may execute a further subsequent iteration of the script including the changed internal action, and, prior to completing a further subsequent iteration of the second instruction for the further subsequent iteration of the script, prevent exportation of third data, generated using the changed internal action, without user authorization (e.g., as described above in connection with FIG. 7). As described above in connection with, for example, FIGS. 8 and 9, the computing device may obtain an additional user authorization to perform the export action on the data generated using the changed internal action, an then allow exportation of the data.

In some examples, the exportation of the second data includes copying the information to a clipboard at the computing device. In some examples, the exportation of the second data includes adding the information in to calendar event, a note, a file, or any other data stored at the computing device. In some examples, obtaining the first data includes obtaining the first data from an application at the computing device, and the exportation of the second data includes providing information associated with the data to another application at the computing device. In some examples, obtaining the first data includes obtaining audio data using a microphone of the computing device, and the exportation of the second data includes sending or playing back the audio data. In some examples, the exportation of the second data includes accessing a remote server.

In one or more implementations, the script can obtain and export public data without any prompts or requests for user authorization. In some examples, public data can include a time, a date, or other publicly available information such as a stock price.

As described herein, aspects of the subject technology may include the collection and transfer of data from an application to other users' computing devices. The present disclosure contemplates that in some instances, this collected data may include personal information data that uniquely identifies or can be used to identify a specific person. Such personal information data can include demographic data, status data, location-based data, calendar data, online identifiers, telephone numbers, email addresses, voice data, audio data, video data, home addresses, images, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in various aspects of providing secure data access for electronic devices. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of providing secure data access for electronic devices, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 11:
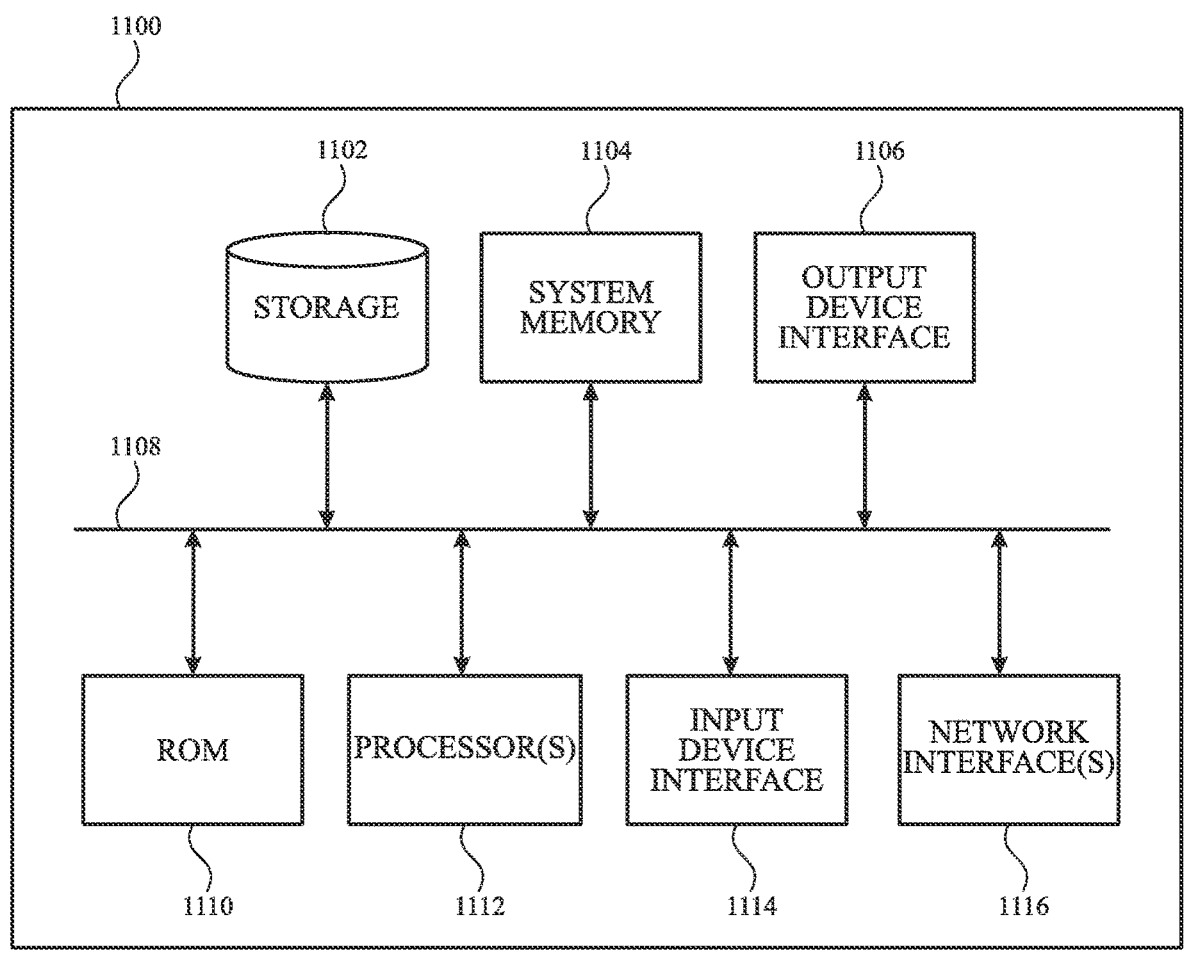
FIG. 11 illustrates an example electronic system with which aspects of the subject technology may be implemented in accordance with one or more implementations.

FIG. 11 illustrates an electronic system 1100 with which one or more implementations of the subject technology may be implemented. The electronic system 1100 can be, and/or can be a part of, one or more of the electronic devices 102 or 104, the servers 120 shown in FIG. 1. The electronic system 1100 may include various types of computer readable media and interfaces for various other types of computer readable media. The electronic system 1100 includes a bus 1108, one or more processing unit(s) 1112, a system memory 1104 (and/or buffer), a ROM 1110, a permanent storage device 1102, an input device interface 1114, an output device interface 1106, and one or more network interfaces 1116, or subsets and variations thereof.

The bus 1108 collectively represents all system, peripheral, and chipset buses that communicatively connect the numerous internal devices of the electronic system 1100. In one or more implementations, the bus 1108 communicatively connects the one or more processing unit(s) 1112 with the ROM 1110, the system memory 1104, and the permanent storage device 1102. From these various memory units, the one or more processing unit(s) 1112 retrieves instructions to execute and data to process in order to execute the processes of the subject disclosure. The one or more processing unit(s) 1112 can be a single processor or a multi-core processor in different implementations.

The ROM 1110 stores static data and instructions that are needed by the one or more processing unit(s) 1112 and other modules of the electronic system 1100. The permanent storage device 1102, on the other hand, may be a read-and-write memory device. The permanent storage device 1102 may be a non-volatile memory unit that stores instructions and data even when the electronic system 1100 is off. In one or more implementations, a mass-storage device (such as a magnetic or optical disk and its corresponding disk drive) may be used as the permanent storage device 1102.

In one or more implementations, a removable storage device (such as a floppy disk, flash drive, and its corresponding disk drive) may be used as the permanent storage device 1102. Like the permanent storage device 1102, the system memory 1104 may be a read-and-write memory device. However, unlike the permanent storage device 1102, the system memory 1104 may be a volatile read-and-write memory, such as random access memory. The system memory 1104 may store any of the instructions and data that one or more processing unit(s) 1112 may need at runtime. In one or more implementations, the processes of the subject disclosure are stored in the system memory 1104, the permanent storage device 1102, and/or the ROM 1110. From these various memory units, the one or more processing unit(s) 1112 retrieves instructions to execute and data to process in order to execute the processes of one or more implementations.

The bus 1108 also connects to the input and output device interfaces 1114 and 1106. The input device interface 1114 enables a user to communicate information and select commands to the electronic system 1100. Input devices that may be used with the input device interface 1114 may include, for example, alphanumeric keyboards and pointing devices (also called "cursor control devices"), cameras, microphones, touch sensors, and/or touchscreens. The output device interface 1106 may enable, for example, the display of images generated by electronic system 1100. Output devices that may be used with the output device interface 1106 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 11, the bus 1108 also couples the electronic system 1100 to one or more networks and/or to one or more network nodes, such as the servers 120 shown in FIG. 1, through the one or more network interface(s) 1116. In this manner, the electronic system 1100 can be a part of a network of computers (such as a LAN, a wide area network ("WAN"), or an Intranet, or a network of networks, such as the Internet. Any or all components of the electronic system 1100 can be used in conjunction with the subject disclosure.

In accordance with aspects of the disclosure, a method is provided that includes receiving, by a computing device, a request to execute a script, wherein the script includes: a first instruction to obtain first data, and a second instruction to export second data associated with the first data; after receiving the request, initiating execution of the script; in accordance with a determination that the first data meets a set of one or more criteria, identifying the first data as unauthorized to be exported; and after executing the first instruction and before completing the second instruction, preventing, based on identifying the first data as unauthorized to be exported, exportation of the second data without user authorization.

In accordance with aspects of the disclosure, a non-transitory machine-readable medium is provided storing instructions that, when executed by one or more processors, cause the one or more processors to perform operations that include receiving, by a computing device, a request to execute a script, wherein the script includes: a first instruction to obtain first data, and a second instruction to export second data associated with the first data; after receiving the request, initiating execution of the script; in accordance with a determination that the first data meets a set of one or more criteria, identifying the first data as unauthorized to be exported; and after executing the first instruction and before completing the second instruction, preventing, based on identifying the first data as unauthorized to be exported, exportation of the second data without user authorization.

In accordance with aspects of the disclosure, an electronic device is provided that includes memory, and one or more processors, where the one or more processors are configured to receive a request to execute a script, wherein the script includes: a first instruction to obtain first data, and a second instruction to export second data associated with the first data; after receiving the request, initiate execution of the script; in accordance with a determination that the first data meets a set of one or more criteria, identify the first data as unauthorized to be exported; and after executing the first instruction and before completing the second instruction, prevent, based on identifying the first data as unauthorized to be exported, exportation of the second data without user authorization.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
receiving, by a computing device, a request to execute a script by a first application, wherein the script includes:
a first instruction to obtain first data, and
a second instruction to export second data associated with the first data by generating a communication to another computing device using a second application separate from the first application executing the script;
after receiving the request, initiating execution of the script by the first application;
in accordance with a determination that the first data meets a set of one or more criteria, identifying the first data as unauthorized to be exported; and
after executing the first instruction and before completing the second instruction, preventing, based on identifying the first data as unauthorized to be exported, exportation of the second data without user authorization.

2. The method of claim 1, wherein the script includes a third instruction to perform at least one internal action on the first data prior to executing the second instruction, the method further comprising tracking the first data through the at least one internal action.

3. The method of claim 1, wherein the exportation of the second data includes storing information associated with the first data in memory of the computing device that is accessible by a process at the computing device that is separate from the script.

4. The method of claim 1, further comprising:
receiving the user authorization for the exportation of the second data;
executing the second instruction for the exportation of the second data based on the user authorization;
executing a subsequent iteration of the script, including executing a subsequent iteration of the second instruction to export the second data without requesting an additional user authorization;
receiving a change to an internal action of the script;
executing a further subsequent iteration of the script including the changed internal action; and
prior to completing a further subsequent iteration of the second instruction for the further subsequent iteration of the script, preventing exportation of third data, generated using the changed internal action, without user authorization.

5. The method of claim 1, further comprising, prior to receiving the request to execute the script, receiving the script at the computing device from another computing device.

6. The method of claim 1, further comprising executing the first instruction to obtain the first data without requesting user authorization.

7. The method of claim 1, wherein the second instruction to export the second data comprises an instruction to perform an export action for the exportation of the second data, the method further comprising:
in accordance with a determination that third data does not meet the set of one or more criteria, performing the export action on the third data without requesting user authorization.

8. The method of claim 1, wherein the second data is a modification of the first data.

9. A non-transitory machine-readable medium storing instructions that, when executed by one or more processors, cause the one or more processors to perform operations that include:
receiving, by a computing device, a request to execute a script by a first application, wherein the script includes:
a first instruction to obtain first data, and
a second instruction to export second data associated with the first data by generating a communication to another computing device using a second application separate from the first application executing the script;

after receiving the request, initiating execution of the script by the first application;

in accordance with a determination that the first data meets a set of one or more criteria, identifying the first data as unauthorized to be exported; and after executing the first instruction and before completing the second instruction, preventing, based on identifying the first data as unauthorized to be exported, exportation of the second data without user authorization.

10. The non-transitory machine-readable medium of claim 9, wherein the script includes a third instruction to perform at least one internal action on the first data prior to executing the second instruction, and wherein the operations further comprise tracking the first data through the at least one internal action.

11. The non-transitory machine-readable medium of claim 9, wherein the exportation of the second data includes storing information associated with the first data in memory of the computing device that is accessible by a process at the computing device that is separate from the script.

12. The non-transitory machine-readable medium of claim 9, the operations further comprising:
receiving the user authorization for the exportation of the second data;
executing the second instruction for the exportation of the second data based on the user authorization;
executing a subsequent iteration of the script, including executing a subsequent iteration of the second instruction to export the second data without requesting an additional user authorization;
receiving a change to an internal action of the script;
executing a further subsequent iteration of the script including the changed internal action; and
prior to completing a further subsequent iteration of the second instruction for the further subsequent iteration of the script, preventing exportation of third data, generated using the changed internal action, without user authorization.

13. The non-transitory machine-readable medium of claim 9, the operations further comprising, prior to receiving the request to execute the script, receiving the script at the computing device from another computing device.

14. An electronic device, comprising:
memory; and
one or more processors, wherein the one or more processors are configured to:
receive a request to execute a script by a first application, wherein the script includes:
a first instruction to obtain first data, and a second instruction to export second data associated with the first data by generating a communication to another computing device using a second application separate from the first application executing the script;

after receiving the request, initiate execution of the script by the first application;

in accordance with a determination that the first data meets a set of one or more criteria, identify the first data as unauthorized to be exported; and after executing the first instruction and before completing the second instruction, prevent, based on identifying the first data as unauthorized to be exported, exportation of the second data without user authorization.

15. The electronic device of claim 14, wherein the one or more processors are further configured to execute the first instruction to obtain the first data without requesting user authorization.

16. The electronic device of claim 14, wherein the second instruction to export the second data comprises an instruction to perform an export action for the exportation of the second data, and wherein the one or more processors are further configured to:
in accordance with a determination that third data does not meet the set of one or more criteria, perform the export action on the third data without requesting user authorization.

17. The electronic device of claim 14, wherein the second data is a modification of the first data.

18. The electronic device of claim 14, wherein the second data is the first data.

19. The electronic device of claim 14, wherein the one or more processors are further configured to:
receive the user authorization for the exportation of the second data;
execute the second instruction for the exportation of the second data based on the user authorization;
execute a subsequent iteration of the script, including executing a subsequent iteration of the second instruction to export the second data without requesting an additional user authorization;
receive a change to an internal action of the script;
execute a further subsequent iteration of the script including the changed internal action; and
prior to completing a further subsequent iteration of the second instruction for the further subsequent iteration of the script, prevent exportation of third data, generated using the changed internal action, without user authorization.

20. The electronic device of claim 14, wherein the one or more processors are further configured to:
receive the user authorization for the exportation of the second data.

* * * * *